United States Patent [19]

Terasawa

[11] Patent Number: 4,739,847

[45] Date of Patent: Apr. 26, 1988

[54] INK JET PRINTER

[75] Inventor: Koji Terasawa, Mitaka, Japan

[73] Assignee: Canon Kabushiki Kaisha, Tokyo, Japan

[21] Appl. No.: 71,737

[22] Filed: Jul. 9, 1987

Related U.S. Application Data

[62] Division of Ser. No. 703,484, Feb. 20, 1985, Pat. No. 4,695,851.

[30] Foreign Application Priority Data

| | | | |
|---|---|---|---|
| Feb. 24, 1984 | [JP] | Japan | 59-34753 |
| Feb. 24, 1984 | [JP] | Japan | 59-34754 |
| Feb. 24, 1984 | [JP] | Japan | 59-34755 |
| Feb. 24, 1984 | [JP] | Japan | 59-34756 |
| Feb. 24, 1984 | [JP] | Japan | 59-34757 |

[51] Int. Cl.[4] .......... G01D 15/18

[52] U.S. Cl. .......... 177/140; 346/75

[58] Field of Search .......... 346/140, 75

[56] References Cited

U.S. PATENT DOCUMENTS

| | | | |
|---|---|---|---|
| 4,293,867 | 10/1981 | Isayama | 346/140 PD |
| 4,368,478 | 1/1983 | Koto | 346/140 PD |
| 4,568,947 | 2/1986 | Regnault | 346/140 IJ |

*Primary Examiner*—George H. Miller, Jr.
*Attorney, Agent, or Firm*—Fitzpatrick, Cella, Harper & Scinto

[57] ABSTRACT

An ink jet printer comprises liquid discharge recording unit for discharging ink onto the recording surface of a recording medium and effecting recording, a transportation device removably carrying the liquid discharge recording unit and movable in a predetermined direction relative to said recording surface, an ink container mounted on said transportation device and containing therein the ink to be supplied to the liquid discharge recording unit, and communication parts provided in the transportation parts for communicating the ink container with the liquid discharge recording unit and having a pipe member.

4 Claims, 10 Drawing Sheets

(A) CAP 130
OPEN
CLOSE
(B) PUMP 160
STOP (CLOSE)
SUCTION
(C) LOCK MEMBER 181
OPEN
CLOSE
(D) MICRO-SWITCH 190
ON
OFF
(E) MICRO-SWITCH 192
ON
OFF
T
TA1
TA2
TA3
TA4
TB1
TB2
T1
T2
TC1
TC2
TC3

INK JET PRINTER

This is a division of application Ser. No. 703,484 now U.S. Pat. No. 4,695,851, filed Feb. 20, 1985.

BACKGROUND OF THE INVENTION

1. Field of the Invention

This invention relates to an ink jet printer.

2. Description of the Prior Art

Among conventional ink jet printers, there is one type which is provided with a carriage which is transportation means movable in a predetermined direction relative to a recording surface and in which recording is effected with the carriage carrying one or more liquid discharge recording units. In the conventional ink jet printer of this type, an ink tank has been provided as an ink container for containing ink to be supplied to the liquid discharge recording unit or units fixed to the printer body and the ink has been supplied to the liquid discharge recording unit or units through an ink supply system including a supply pipe. In such a construction, however, the amount of so-called creep of the ink supply pipe has been great with the distance between the ink tank and the liquid discharge recording unit or units taken into account and accordingly, the mixing of air with the supply path has been liable to occur, and this has led to a problem that accurate ink discharge may not be effected. Also, particularly in an ink jet printer provided with a plurality of liquid injection recording units, there arises a problem that the piping of the ink supply system becomes complicated.

Further, during recording, the distance between the liquid discharge recording unit carried on the carriage and the ink tank fixed to the apparatus body is varied and therefore, a tube formed of a material of high flexibility such as vinyl chloride or polyethylene must be selected as the supply pipe. Generally, such a soft supply pipe readily permits the mixing of air and therefore, the above-noted problems may become more serious.

Also, among the ink jet printers of this type, there is one in which, when bubbles are mixed with the liquid discharge recording unit or when the nozzle portion thereof is clogged, the carriage is positioned at a predetermined position which is not opposed to the recording surface, for example, a home position, and ink is sucked from the nozzle portion by a suction mechanism disposed at that position to thereby eliminate the bubbles or the clogging.

In such an ink jet printer, it has been a task to reliably discharge the ink sucked by the suction mechanism without leakage and moreover enable the discharged ink to be readily discarded from the ink jet printer.

Further, in such an ink jet printer, when the sucking process is to be effected, the suction mechanism must effect the process of moving cap means joined to the ink discharge portion of the liquid discharge recording unit toward the ink discharge portion and the process of driving suction means for sucking the ink from the ink discharge portion in the joined state. Thus, it would come to mind to connect those means to respective drive sources and drive the drive sources at an appropriate timing to thereby effect a series of sucking processes.

According to this, however, the number of drive sources increases in accordance with the number of driven means and therefore, not only will the apparatus become bulky and expensive, but also there will arise a problem that the control system for timing the driving will become complex.

Also, it is preferable to provide locking means for fixing the liquid discharge recording unit to the suction mechanism throughout such a series of sucking processes and holding appropriate junction.

Thus, it would come to mind to connect those means to respective drive sources and drive the drive sources at an appropriate timing to thereby effect the series of sucking processes while holding the junction.

Again in this case, however, the number of drive sources increases in accordance with the number of driven means and therefore, not only will the apparatus become bulky and expensive, but also there will arise a problem that the control system for timing the driving will become complex.

SUMMARY OF THE INVENTION

It is an object of the present invention to eliminate the above-noted problems peculiar to the prior art and to provide an ink jet printer which is simple in construction and provided with an ink supply system in which it is difficult for the mixing of air to occur.

It is a further object of the present invention to provide an ink jet printer in which an ink tank is mounted on a carriage, whereby the distance of the supply path between the liquid discharge recording unit and the ink tank is made short and invariable to make it difficult for the mixing of air to occur and in which, even when the mixing of air occurs, it can be detected in the course of the supply path.

It is still a further object of the present invention to provide an ink jet printer in which waste ink containing means for containing therein the ink discharged is made mountable on the carriage and moreover, the waste ink containing means and the ink discharge means of a suction mechanism can be appropriately joined together, whereby the discharge of ink can be reliably effected and moreover the ink can be easily discarded.

It is yet still a further object of the present invention to provide an ink jet printer which is provided with only a single drive source and in which the movement thereof is appropriately transmitted to cap means and suction means to effect a series of sucking processes, whereby the ink jet printer is made inexpensive and compact.

It is another object of the present invention to provide an ink jet printer which is provided with only a single drive source and in which the movement thereof is appropriately transmitted to locking means, cap means and suction means to effect a series of sucking processes while holding the junction, whereby the ink jet printer is made inexpensive and compact.

It is still another object of the present invention to provide an ink jet printer provided with liquid discharge recording means for discharging ink to the recording surface of a recording medium and effecting recording, transportation means removably carrying said liquid discharge recording means and movable in a predetermined direction of said recording surface, an ink container mounted on said transportation means and containing therein the ink to be supplied to said liquid discharge recording means, and communication means provided in said transportation means for communicating said ink container with said liquid discharge recording means and having a pipe member.

It is yet still another object of the present invention to provide an ink jet printer provided with liquid discharge recording means for discharging ink to the recording surface of a recording medium and effecting recording, transportation means carrying said liquid discharge recording means and movable in a predetermined direction of said recording surface, an ink container mounted on said transportation means and containing therein the ink to be supplied to said liquid discharge recording means, communication means for communicating said ink container with said liquid discharge recording means, and detecting means for detecting the mixing of air in the course of said communication means.

It is a further object of the present invention to provide an ink jet printer provided with liquid discharge recording means for discharging ink to the recording surface of a recording medium and effecting recording, transportation means carrying said liquid discharge recording means and movable in a predetermined direction of said recording surface, suction means for sucking the ink from said liquid discharge recording means when said transportation means is positioned at a predetermined position in which said liquid discharge recording means is not opposed to said recording surface, waste ink containing means removably mountable on said transportation means, and discharge means communicating with said waste ink containing means in said position and discharging into said waste ink containing means the ink sucked by said suction means.

It is still a further object of the present invention to provide an ink jet printer which is provided with liquid discharge recording means for discharging ink to the recording surface of a recording medium and effecting recording and wherein joining means capable of being joined with said liquid discharge recording means and suction means for sucking the ink from said liquid discharge recording means through said joining means during the joining are driven by a single drive means.

It is yet still a further object of the present invention to provide an ink jet printer which is provided with liquid discharge recording means for discharging ink to the recording surface of a recording medium and effecting recording and wherein joining means capable of being joined with said liquid discharge recording means, holding means for fixing said liquid discharge recording means during the joining and holding the joined state, and suction means for sucking the ink from said liquid discharge recording means through said joining means during the joining are driven by a single drive means.

DESCRIPTION OF THE PREFERRED EMBODIMENT

The present invention will hereinafter be described in detail with reference to the drawings.

Figure 1:
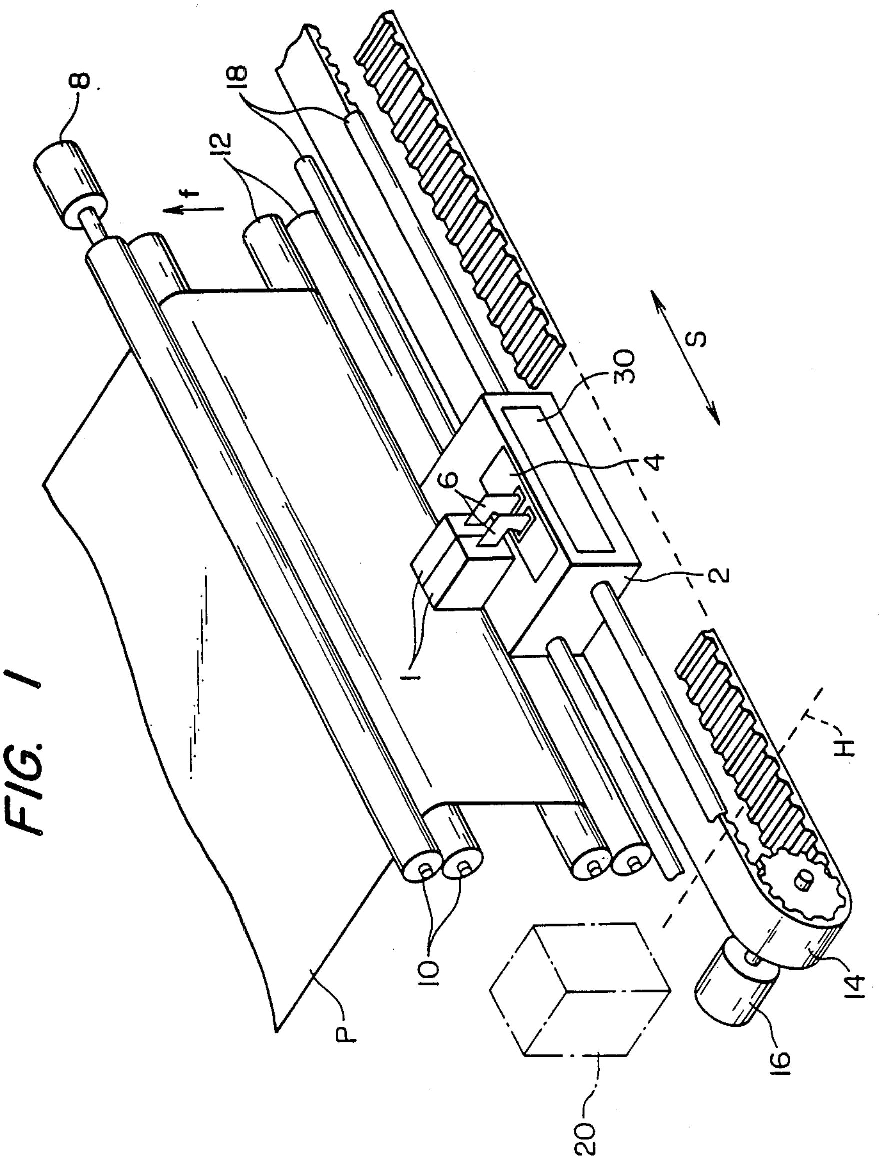
FIG. 1 is a perspective view showing an example of the construction of the ink jet printer of the invention.

FIG. 1 shows an example of the construction of the essential portions of an ink jet printer to which the present invention is applicable. In FIG. 1, reference numeral 1 designates a liquid discharge recording unit mounted on a carriage 2 and having a reservoir for storing therein ink supplied from an ink supply source and a recording head provided with an ink discharge portion for discharging the stored ink. Two such units 1 are provided in accordance with the colors of the ink. An ink tank as the ink supply source is usually removably provided on the carriage 2, as will later be described. Reference numeral 4 designates a printed wiring plate for controlling the ink discharge by the liquid injection recording unit 1, and reference numeral 6 denotes a flexible cable for connecting the printed wiring plate 4 to the liquid discharge recording unit 1. The printed wiring plate 4 and the flexible cable 6 are connected together through a connector 5. Designated by 8 is a paper feeding motor. In response to the driving of this paper feeding motor 8, recording paper P is conveyed in the direction of arrow f by rollers 10 and 10. Reference numeral 12 denotes rollers which cooperate with the rollers 10 to control the recording paper P form a flat recording surface for the liquid discharge recording unit 1.

Reference numeral 14 designates a carriage driving belt to which the carraige 2 is fixed, reference numeral 16 denotes a motor for driving the belt 14 in the directions of bilateral arrow S, and numeral 18 designates guide rails for the carriage 2. The carriage 2 may be moved in the directions of bilateral arrow S along the guide rails 18 in accordance with the driving of the motor 16 to thereby accomplish recording on the recording surface.

Reference numeral 20 denotes a suction mechanism which is opposed to the liquid discharge recording unit 1, for example, in the home position H of the unit 1 and effects suction or the like of the ink.

Figure 2:
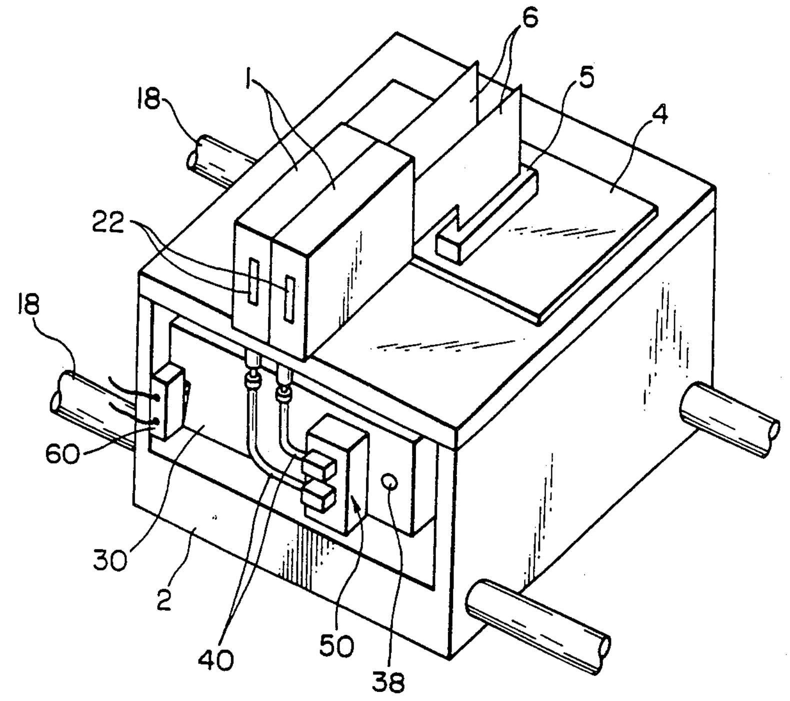
FIG. 2 is a perspective view showing an example of the carriage portion including the liquid discharge recording unit of the ink jet printer shown in FIG. 1.

FIG. 2 shows an example of the construction of the essential portions of an ink supply system including the liquid discharge recording unit and the carriage. Reference numeral 22 designates ink discharge portions which are provided in the liquid discharge recording unit 1 and inject ink onto the recording surface. Reference numeral 30 denotes an ink tank (a cartridge tank)

removable with respect to the carriage 2 and supplying the ink to the liquid discharge recording unit 1 in the mounted position thereof. This cartridge tank 30 may be provided with a supplied ink container as the ink supply source and in addition, a waste ink container for containing therein waste ink sucked by the suction mechanism 20. Reference numeral 38 designates a waste ink introducing port communicating with the waste ink container and capable of receiving the ink discharge port of the suction mechanism 20.

Reference numeral 40 denotes ink supply pipes for the liquid discharge recording unit 1, and reference numeral 50 designates a joint portion for connecting the supplied ink container of the cartridge 30 to the supply pipes 40. Reference numeral 60 denotes a microswitch which is container detecting means for detecting the presence of the ink container, herein the cartridge 30.

Figure 3:
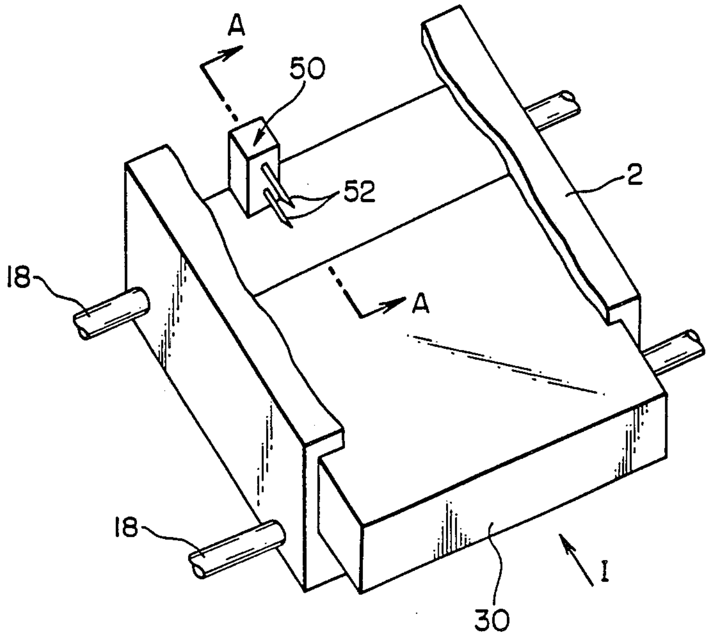
FIG. 3 is a perspective view showing the manner in which, in the ink jet printer of FIG. 1, a cartridge tank is mounted on the carriage.

FIG. 3 shows the manner in which the cartridge 30 is mounted onto the carriage 2. Reference numeral 52 designates hollow needles which are pipe members connected to the supply pipes 40 which are pipe members. In response to the mounting of the cartridge 30 in the direction of arrow I, the hollow needles 52 communicate the supplied ink container to the liquid discharge recording unit 1.

Figure 4:
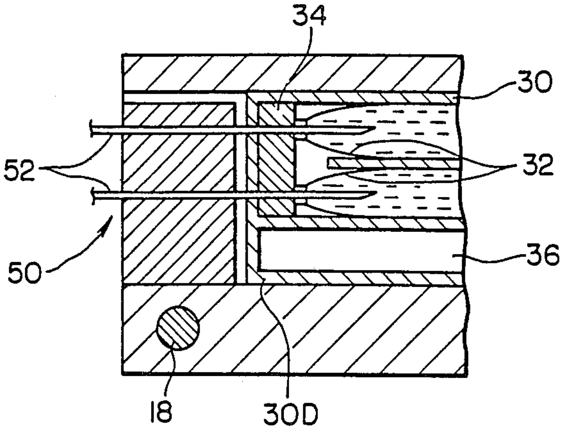
FIG. 4 is a cross-sectional view of the carriage portion during the mounting of the cartridge tank.

FIG. 4 shows a cross-section of the cartridge in its mounted state taken along line A—A of FIG. 3. As shown, the needles 52 provided for the supplied ink containers 32 corresponding to the number of colors of the ink used can be inserted into the cartridge tank 30, and the cartridge tank 30 may be provided with a rubber member 34 for maintaining the liquid tightness of the ink in the inserted state of the needles and a waste ink container 36. If, for example, a flexible bag member of hermetically sealed structure is disposed in each supplied ink container 32 so that a desired pressure, for example, atmospheric pressure, can be maintained, the ink will be supplied from the supplied ink containers 32 to the liquid discharge recording unit 1 through the needle members 52 and the supply pipes 40 in response to the discharge of the ink from the ink discharge portion 22. Also, if, for example, a porous material is provided in the waste ink container, absorption of waste ink can be reliably accomplished and leakage of the ink from the waste ink introducing port 38 can be prevented.

Figure 5:
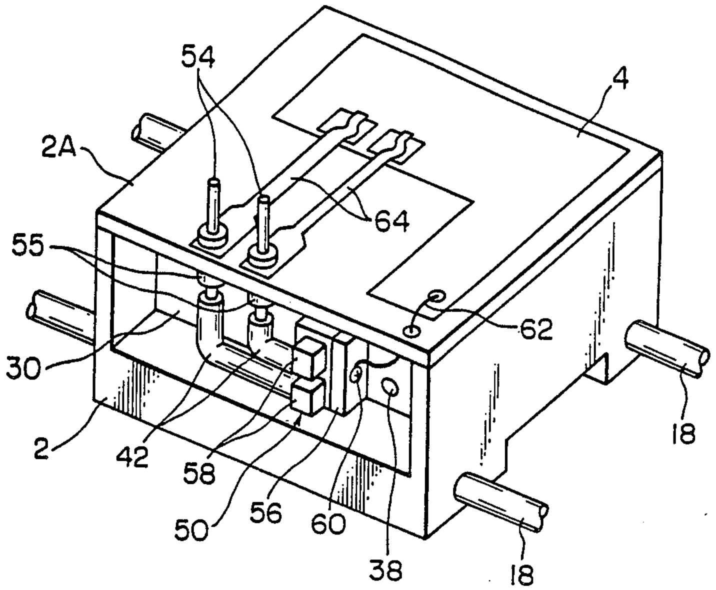
FIG. 5 is a perspective view showing the carriage portion in the ink jet printer of FIG. 1 with the liquid discharge recording unit removed therefrom.

FIG. 5 shows an example of the construction of the ink supply system and the detecting means of a bubble detecting system with the liquid discharge recording unit removed therefrom. In FIG. 5, reference numeral 54 designates the joints of the pipe members connectible to the liquid discharge recording unit 1 and introducing the ink into the ink reservoir thereof, and reference numeral 55 denotes fixing members such as nuts for fixing the joints 54 to the upper plate 2A of the carriage 2. Reference numeral 56 designates a keep member for fixing the needles 52, and reference numeral 58 denotes joints for connecting the needles 52 to the supply pipes 42. The joints 54 can be made to serve as positioning and/or fixing means for the liquid discharge recording unit 1.

By thus making the cartridge tank 30 mountable on the carriage 2, the supply system can be shortened and further, during the recording, the relative position of the carriage 2 and the cartridge tank 30 is invariable and therefore, the supply system may be of relatively high hardness and the mixing of air with the supply path can be reduced.

In the present embodiment, the detecting means for detecting the mixing of air is constructed, for example, by making the joints 54, the needles 52 and the keep member 56 into electrically conductive metallic members, forming the supply pipes 42 of electrically nonconductive hard rubber or plastic, connecting one end of a lead wire 62 to the keep member 56 by a screw 60, directing the other end of the lead wire 62 to the printed wiring plate 4, connecting, for example, one end of each flexible electrode flat plate 64 to the joints 54, and urging the other ends of the flexible electrode flat plates 64 against the electrode on the printed wiring plate 4 side.

That is, when the supply pipes 42 are filled with ink, there exists a resistance value determined by the inside diameter of the supply pipes 42 and the composition of the ink used, and when an air layer is present, the joints 54 and the needles 52 are electrically insulated and the resistance therebetween reaches infinity. Therefore, if a circuit which does not operate when the joints 54 and the needles 52 are supplied with electric power, that is, when the supply pipes 42 are filled with ink, and which operates to produce an alarm when an air layer is present and the joints 54 and the needles 52 are insulated is formed on the printed wiring plate 4 or the like, mixing of air can be readily detected. This alarm means may be of various known configurations using, for example, a light-emitting doide or a buzzer. Also, if the resistance value when the supply pipes are filled with ink is made small by selecting supply pipes having a large inside diameter, the detection accuracy can be enhanced.

When mixing of bubbles with the liquid discharge recording unit 1 is detected by such bubble detecting means, that is, when the reservoir in the unit or the ink flow path communicating with the ink discharge portion 22 is filled with ink during the initial use of the unit, or when the ink discharge portion 22 is clogged, the ink is sucked from the ink discharge portion 22 by the suction mechanism 20, whereby the ink discharge can be recovered.

Figure 6:
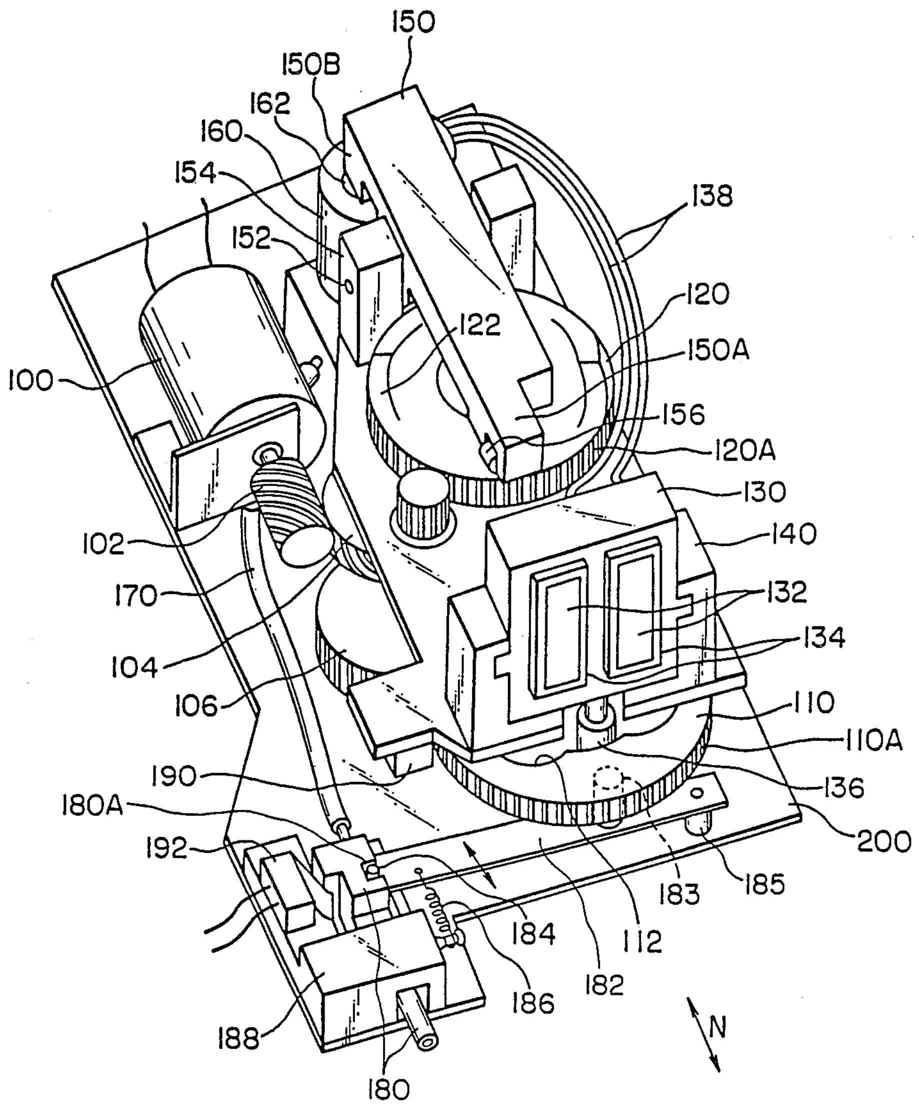
FIG. 6 is a perspective view showing an example of the construction of a suction mechanism in the ink jet printer of FIG. 1.

FIG. 6 shows an example of the construction of such a suction mechanism. In FIG. 6, reference numeral 100 designates a motor as the drive source (drive means) of the suction mechanism. The revolution of this motor 100 is transmitted through a gear train 102, 104, 106 to the gear surface 110A of a cam 110 and is further transmitted through a gear train 102, 104, 108 to the gear surface 120A of a cam 120.

Cam surfaces 112 and 122 having the displacement curves as shown, for example, in FIGS. 8(A) and (B) are formed on the cams 110 and 120, respectively.

Reference numeral 130 designates a cap member which is joining means adapted to be opposed to the liquid discharge recording unit 1 when the carriage 2 is positioned at its home position H. The cap member 130 has absorbing members 132 formed, for example, of a water absorbing porous material and rubber members 134 for maintaining the air tightness with respect to the ink discharge portion 22 in the joined state thereof. This cap member 130 is provided with a shaft having a roller 136 adapted to contact the cam surface 112 at a position opposed to the ink discharge portion 22. If the roller 136 is designed to normally contact the cam surface 112 with the aid of a spring, not shown, biased toward the cam surface 112, the displacement of the cam surface 112 will be faithfully transmitted to the cap member 130, which will thus be moved in the directions of bilateral arrow N along a guide 140.

Designated by 150 is a lever having an end portion 150A provided with a roller 156 which rollingly contacts the cam surface 122 of the cam 120, and an end portion 150B connected to the piston 162 of a pump 160 to drive the piston 162. Between those end portions, the lever 150 is supported on a support member 154 by a pin 152 and is pivotable about the pin 152. A spring for pushing up the piston 162 is contained in the pump 160. The lever 150 may be provided with a spring biased in a direction in which the end portion 150A bears against the cam surface 122. That is, in response to the rotation of the cam 120, the lever 150 pivots about the pin 152 and accordingly, the piston 162 is reciprocally moved to thereby drive the pump 160.

This pump 160 and the cap member 130 are connected together through suction pipes 138. That is, in response to the driving of the pump 160, ink is sucked from the ink discharge portion 22 through the absorbing members 132 and is directed into the pump 160 through the suction pipes 138.

The number of the absorbing members 132 and of the suction pipes 138 may correspond to the colors of the inks used. Where inks of two colors are used as in the present embodiment, one absorbing member 132 and one suction pipe 138 are provided correspondingly to an ink of one color and, even if inks of multiple colors are mixed together in the pump 160, each suction pipe 138 is sealed in the pump 160 by a piston ring, whereby the influence of the mixed inks is not imparted to the ink discharge portion 22.

The ink thus sucked into the pump 160 can be discharged through a waste ink pipe 170 connected to the pump 160.

Assuming that the waste ink is discharged from the waste ink introducing port 38 shown in FIG. 2 into the waste ink container 36 which is waste ink containing means, a discharge member 180 to which the waste ink pipe 170 is connected may be moved in the direction N and inserted into the waste ink introducing port 38. Movement of this discharge member 180 can be accomplished, for example, in the manner described below.

A cam surface having the displacement curve as shown in FIG. 8(C) is formed on the underside of the cam 110 as viewed in FIG. 6, and design is made such that this cam surface and a roller 183 provided on a discharge lever 182 make rolling contact with each other. The discharge lever 182 has one end thereof supported on a shaft 185 projected from a base board 200 and is pivotable about the shaft 185. The other end of the discharge lever 182 is engaged with the recess 180A of the discharge member 180 through a pin 184 so that in response to the pivotal movement of the discharge lever 182 about the shaft 185, the discharge member 180 may move in the direction N. Designated by 188 is a guide member for controlling the movement of the discharge member 180 only in the direction N. A spring 186 is provided between this guide member 188 and the discharge lever 182 so that the roller 183 may always be in contact with the cam surface. Separately from the container detecting means for detecting the presence of the ink container, containing means detecting means for detecting the presence of waste ink containing means may be provided on the carriage.

In FIG. 6, reference numerals 190 and 192 designate microswitches which are position detecting means for detecting the positions of the cap 130 and the discharge member 180. The ON-OFF information of these microswitches can be used for the control of the motor 100, for example, for the cap handling for the transportation of the ink jet printer.

Figure 7:
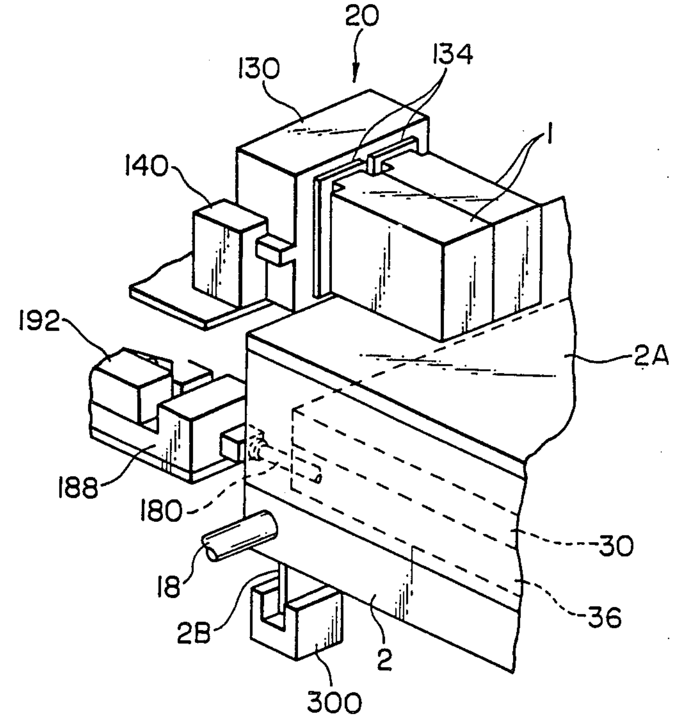
FIG. 7 is a perspective view showing an example of the waste ink discharge means in the ink jet printer of FIG. 1.

FIG. 7 shows the suction mechanism 20 and the liquid discharge recording unit 1 as they are joined together. Reference character 2B designates a shield plate provided on the carriage 2, and reference numeral 300 denotes a photosensor provided at the home position. By the cooperation between these members, there can be provided carriage position detecting means for detecting that the carriage 2 is in its home position.

Figure 8:
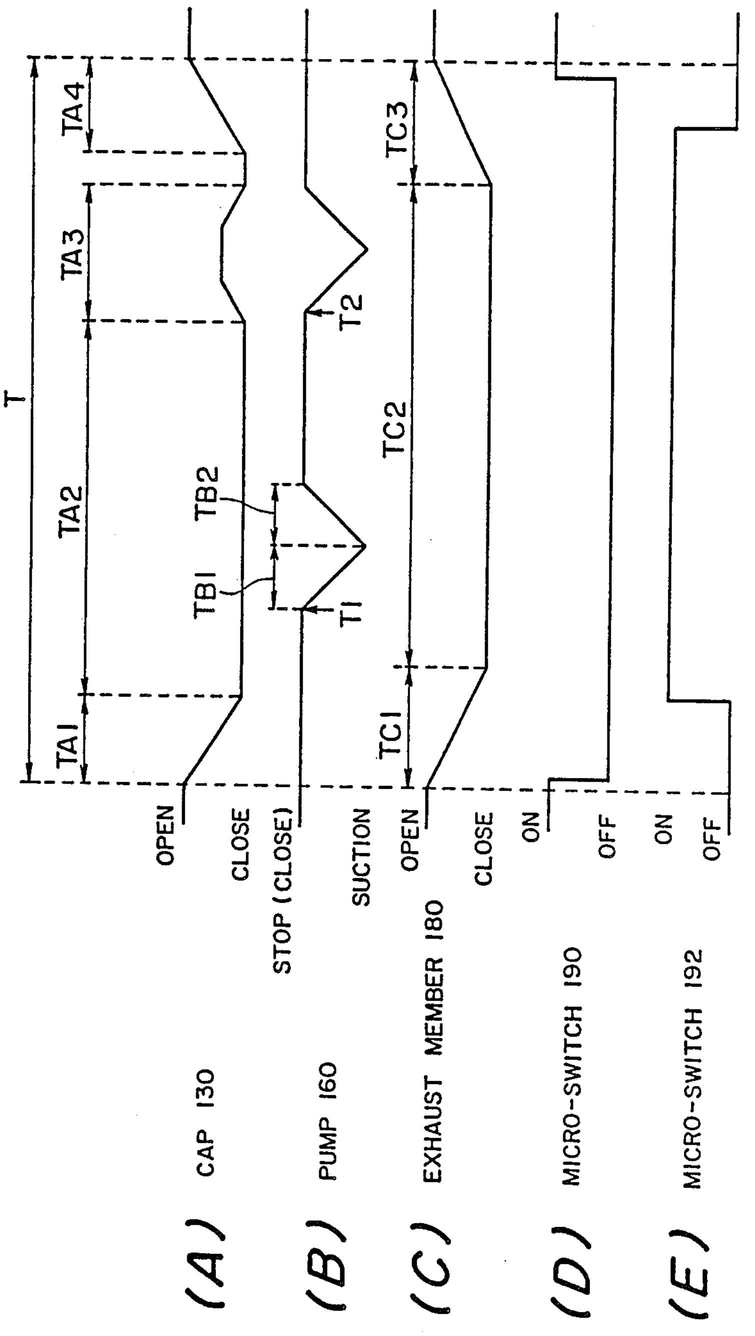
FIGS. 8A–8E is a timing chart showing the operation timing of each portion of the suction mechanism of FIG. 7 including the waste ink discharge means.

FIG. 8 shows the operation timing of each portion of the suction mechanism. In FIG. 8, the displacement curve (A) of the cap 130, the curve (B) showing the operation of the pump 160 and the displacement curve (C) of the discharge member 180 respectively correspond to the outline curves of the cam surface 112 of the cam 110, the cam surface 122 of the cam 120 and the cam surface provided on the underside of the cam 110. Also, the period T corresponds to one full rotation (360°) of the cams 110 and 120.

In FIGS. 8(A) and (C), the periods TA1 and TC1 respectively are a period during which the cap 130 is moved toward the ink discharge portion 22 in accordance with the rotation of the cam 110 and a period during which the discharge member 180 is moved toward the waste ink introducing port 38. In the process of such movement, the microswitch 190 is opened and the microswitch 192 is closed as shown in FIGS. 8(D) and (E).

The time period TA2 is a period during which the cap 130 contacts the ink discharge portion 22 and the ink flow path from the ink discharge portion 22 to the pump 160 is closed. The period TC2 is a time period during which the fore end portion of the discharge member 180 enters the waste ink introducing port 38 and the ink flow path from the pump 160 to the waste ink absorbing portion 36 is closed to enable the suction and discharge of ink corresponding to the driving of the pump.

During the period of TC2, the cam surface 122 of the cam 120 is positioned so that the pump 160 is driven. That is, as shown in FIG. 8(B), at the points of time T1 and T2, the driving of the pump is effected by the displacement of the cam 120. In one stroke which comprises the time period TB1 during which the suction and discharge operation by the downward movement of the piston 162 from the point of time T1 is effected and the period TB2 during which the discharge operation is effected, the cap 130 is closed and therefore, ink is sucked from the ink discharge portion 22 and is discharged into the waste ink container 36. Also, as shown in FIG. 8(A), during the period TA3 during which the cap member 130 is slightly separated from the ink discharge portion 22, the driving of the pump is effected from the point of time T2, and in this one stroke, the ink remaining in the absorbing member 132 and the suction pipe 138 is sucked and discharged.

The time periods TA4 and TC3 after such suction and discharge are a period during which the cap 130 and the discharge member 180 are separated from the carriage 2 side, and in this process of separation, the microswitch 190 is closed and the microswitch 192 is opened.

Figure 9:
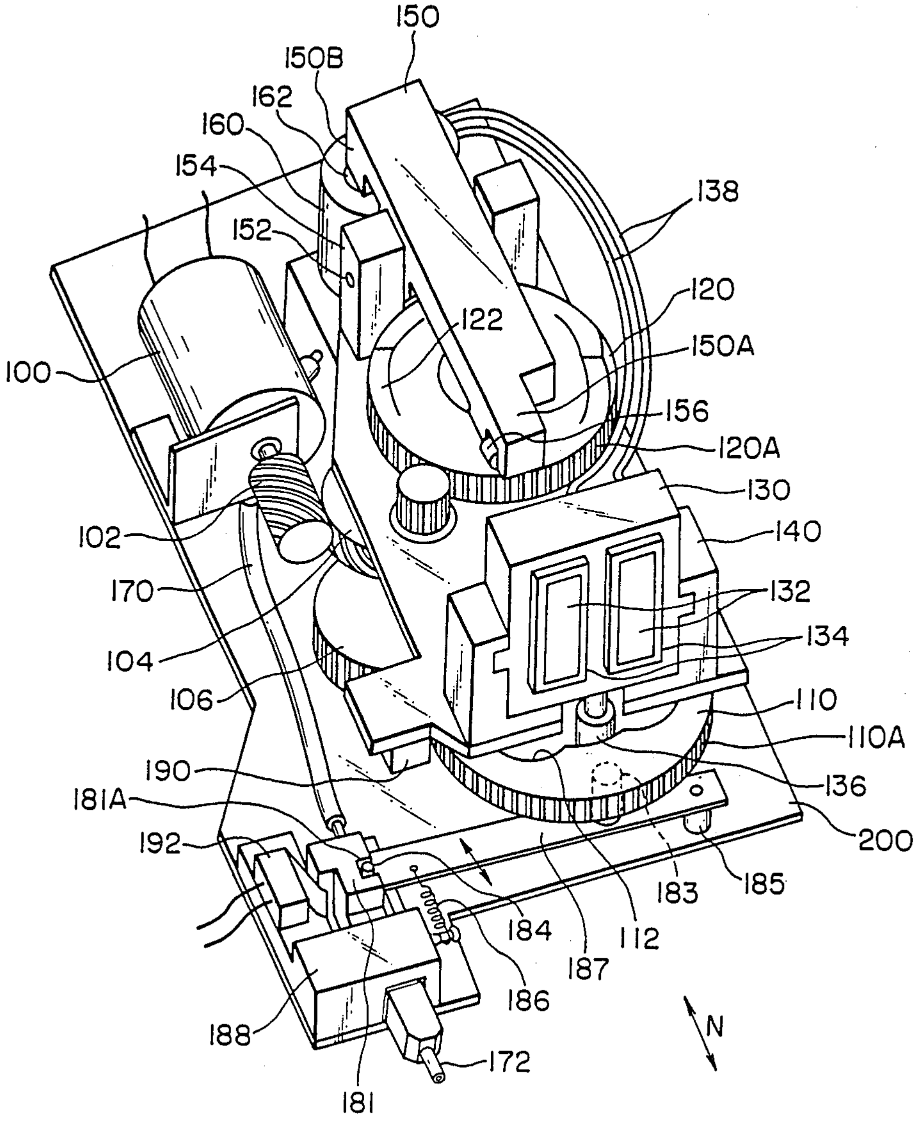
FIG. 9 is a perspective view showing an example of the construction of the suction mechanism in the ink jet printer of the present invention.
Figure 10:
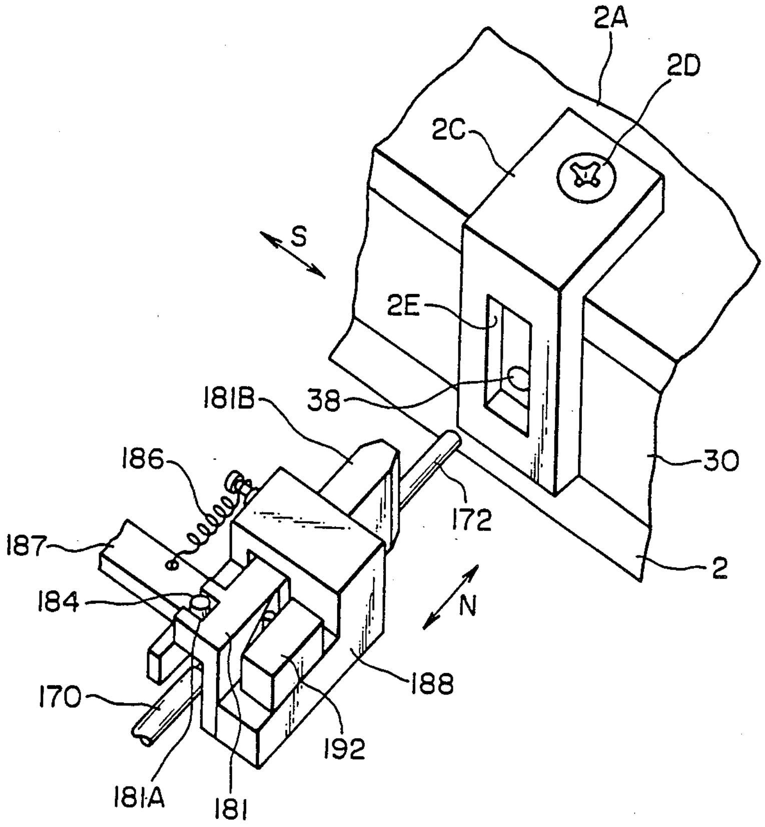
FIG. 10 is a perspective view for illustrating the carriage locking state in the suction mechanism.
Figure 11:
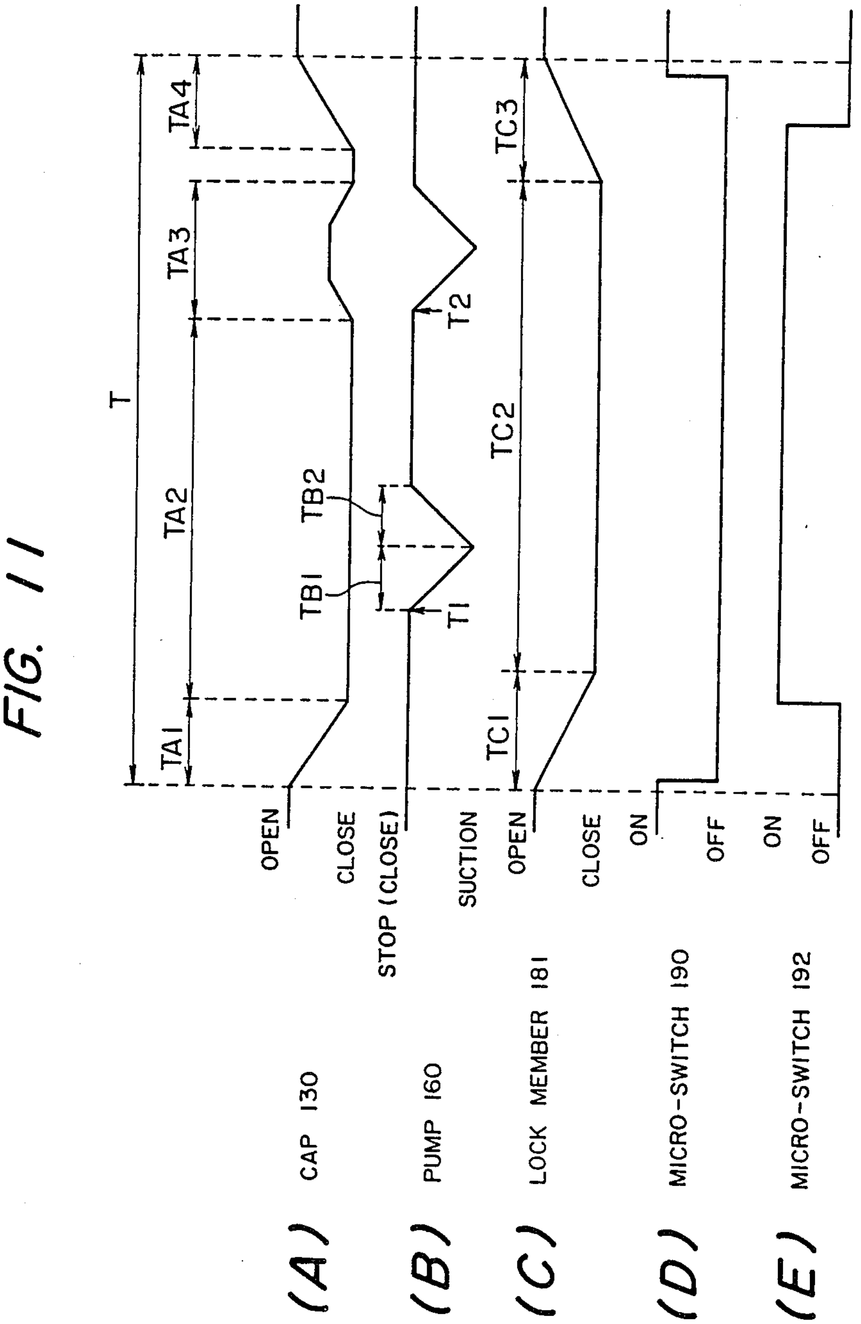
FIGS. 11A–11E is a timing chart showing the operation timing of each portion of the suction mechanism of FIG. 9.

Reference is now had to FIGS. 9 to 11 to describe an example in which a locking mechanism which is holding means for coupling the carriage 2 to the suction mechanism is provided to ensure the coupling between the suction mechanism 20 and the liquid discharge recording unit 1 when such suction process is carried out. In FIGS. 9 and 10, reference numerals similar to those indicated in FIGS. 6 and 7 designate similar members and these need not be described in detail. There is provided a locking member 181 constituting a locking mechanism adapted to move in the direction N to fix the carriage 2 when the carriage 2 is positioned in its home position H. The movement of this locking member 181 can be accomplished, for example, in the manner described below.

A cam surface having the displacement curve as shown in FIG. 11(C) is formed on the underside of the cam 110 so that this cam surface and a roller 183 provided on a locking lever 187 may make rolling contact with each other. The locking lever 187 has one end thereof supported on a shaft 185 projected from a base board 200 and is pivotable about the shaft 185 The other end of the locking lever 187 is engaged with the recess 181A of the locking member 181 through a pin 184 so that the locking member 181 may be moved in the direction N in response to the pivotal movement of the locking lever 187 about the shaft 185. Reference numeral 188 designates a guide member for controlling the movement of the locking member 181 only in the direction N. A spring 186 is provided between this guide member 188 and the locking lever 187 so that the roller 183 may always be in contact with the cam surface.

Assuming that the waste ink discharged by the pump 160 is discharged from the waste ink introducing port 38 of the cartridge tank 30 into the waste ink container, the discharge member 172 to which the waste ink pipe 170 is connected can also be moved in the direction N and inserted into the waste ink introducing port 38. In the present embodiment, the discharge member 172 is fixed to the locking member 181 so that the discharge member 172 may also move with the movement of the locking member 181.

In FIG. 9, reference numerals 190 and 192 designate microswitches which are detecting means for detecting the positions of the cap 130 and the locking member 181, respectively. The ON-OFF information of these microswitches can be used for the control of the motor 100, for example, for the capping process or the like for the transportation of the ink jet printer.

FIG. 10 is a perspective view showing the locking member 181 and the carriage 2. A fixing member 2C is fixed to the carriage 2 by a bolt 2D correspondingly to the locking member 181. This fixing member 2C is formed with a window 2E in connection with the fore end portion 181B of the locking member 181 so that the fore end portion 181B may be fitted in the window 2E when the locking of the carriage 2 is effected. If the end surface of the fore end 181B is chamfered, more or less adjustment of the position of the carriage 2 can be accomplished in the locked position.

In such locked position, the discharge member 172 comes into the waste ink container 36 from the waste ink introducing port 38 of the cartridge tank 30 and discharge of ink is effected in response to the driving of the pump 160. Also, the discharge member 172 is protected by the locking member 181 and therefore, even if there occurs a minute deviation between the carriage 2 and the suction mechanism 20, the discharge member 172 will not be subjected to any force.

FIG. 11 shows the operation timing of each portion of the suction mechanism. In FIG. 11, the displacement curve (A) of the cap 130, the curve (B) showing the operation of the pump 160 and the displacement curve (C) of the locking member 181 respectively correspond to the outline curves of the cam surface 112 of the cam 110, the cam surface 122 of the cam 120 and the cam surface provided on the underside of the cam 110.

Also, the time period T corresponds to one full rotation (360°) of the cams 110 and 120.

In FIGS. 11(A) and (C), the periods TA1 and TC1 respectively are a period during which the cap 130 is moved toward the ink discharge portion 22 in response to the rotation of the cam 110 and a period during which the locking member 181 is moved toward the window 2E. In this process of movement, as shown in FIGS. 11(D) and (E), the microswitch 190 is opened and the microswitch 192 is closed.

The time period TA2 is a period during which the cap 130 contacts the ink discharge portion 22 and the ink flow path from the ink discharge portion 22 to the pump 160 is closed. The period TC2 is a period during which the fore end portion 180B of the locking member 181 is fitted in the window 2E and the discharge member 172 enters the waste ink introducing port 38 and the ink flow path from the pump 160 to the waste ink container 36 is closed to thereby enable the suction and discharge of ink corresponding to the driving of the pump.

During this time period TA3, the cam surface 122 of the cam 120 is so positioned that the pump 160 may be driven. That is, as shown in FIG. 11(B), at points of time T1 and T2, the driving of the pump is effected by displacement of the cam 120. In one stroke comprising a period TB1 during which the suction and discharge operation by the downward movement of the piston 162 from the point of time T1 is effected and a period TB2 during which the discharge operation is effected, the cap 130 is closed and therefore, ink is sucked from the ink discharge portion 22 and is discharged into the waste ink container 36. Also, as shown in FIG. 11(A), during a period TA3 during which the cap member 130 is slightly separated from the ink discharge portion 22, the driving of the pump is effected from the point of time T2, and in this one stroke, the ink remaining in the absorbing member 132 and the supply pipe 138 is sucked and discharged.

The periods TA4 and TC3 after such suction and discharge are periods during which the cap 130 and the locking member 181 respectively are separated from the carriage 2 side, and in this process of separation, the microswitch 190 is closed and the microswitch 192 is opened.

The discharge into the waste ink container 36 in the cartridge tank 30 can also be accomplished without the discharge member being moved toward the cartridge tank 30 side. That is, such discharge can be accomplished with the discharge member being provided at a fixed position on the ink jet printer.

Figure 12:
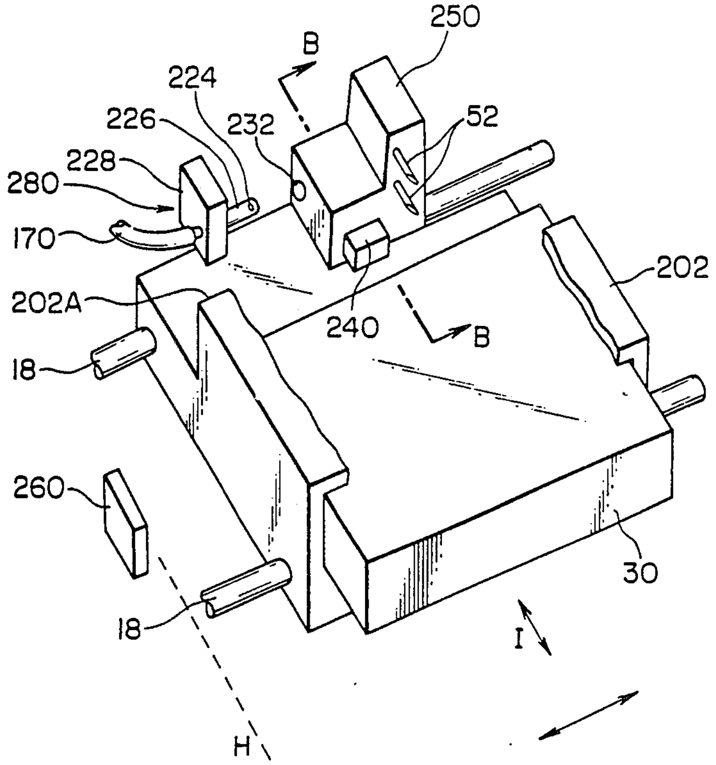
FIG. 12 is a perspective view showing another example of the waste ink discharge means.

FIG. 12 shows another embodiment of such waste ink discharge means. In FIG. 12, reference numeral 280 designates a discharge member fixed onto the ink jet printer. The discharge member 280 has a discharge pipe 226 provided with a discharge port 224 near the fore end portion thereof, and a fixing member 228 for fixing the discharge pipe 226 in parallelism to the direction of movement S of the carriage 202 and at a predetermined position near the home position H. The other end of the discharge pipe 226 is connected to a waste ink pipe 170 communicating with the pump 160.

Reference numeral 250 designates a needle keep member having a waste ink communication hole 232 for receiving the discharge pipe 226 and provided with a waste ink communicating member 240 for transporting the waste ink to the waste ink container 36 of the cartridge tank 30. Reference numeral 202 denotes a carriage capable of containing the cartridge 30 therein and having a cut-away portion 202A for avoiding the contact with the discharge member 280 near the home position H. Reference numeral 260 designates a restraining member for stopping the carriage 202 at the home position H. The discharge port 224 is adapted to appropriately come into the waste ink communication hole 232 when the carriage 202 is restrained by the restraining member 260.

Figure 13:
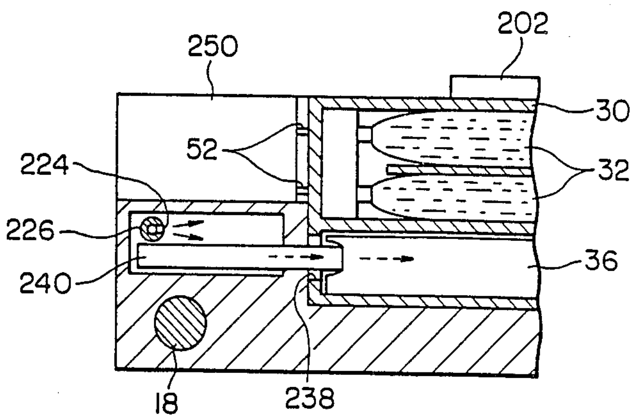
FIG. 13 is a cross-section view of the waste ink discharge means shown in FIG. 12.

FIG. 13 shows a cross-section taken along line B—B in FIG. 12. In FIG. 13, reference numeral 238 designates the waste ink introducing port of the cartridge tank 30 which receives the waste ink communicating member 240 in the mounted condition of the cartridge tank 30.

If, for example, a porous material is used as the waste ink communicating member 240, the waste ink will be discharged into the waste ink container 36, as indicated by arrow in FIG. 13, by the capillary forces of the waste ink communicating member 240 and the waste ink container when the waste ink is transported to the discharge port 224 by the pump 160.

According to the present invention, as described above, the liquid discharge recording unit and the ink tank are mounted on the carriage and therefore, an ink supply system which is simple in construction and in which it is difficult for the mixing of air to occur can be realized, whereby there can be provided an ink jet printer of high reliability.

Also, according to the present invention, the ink supply path between the liquid discharge recording unit and the ink tank is short and invariable and therefore, it is difficult for the mixing of air to occur, and also, air detecting means is provided in the course of the supply path and therefore, even if the mixing of air occurs, it can be detected before it affects the liquid discharge recording unit, whereby there can be realized an ink jet printer of high reliability.

Further, according to the present invention, the waste ink containing means is made mountable on the carriage so that the ink discharged from the suction mechanism can be reliably introduced into the waste ink containing means and therefore, there can be realized an ink jet printer in which the discharge of ink is reliable and moreover the discarding of ink from the main body can be readily effected.

In addition, according to the above-described embodiment, the waste ink containing means is provided in the cartridge tank having the supplied ink container as the ink supply source of the liquid discharge recording unit and therefore, the discarding of ink can be effected simultaneously with the interchange of the cartridge tank and thus, the discarding of ink can be more readily effected.

Still further, according to the present invention, the handling of the cap of the liquid discharge recording unit and the ink suction process can be accomplished by a single drive source, and this leads to the realization of an inexpensive and compact with ink jet printer.

Furthermore, according to the present invention, the process of maintaining the joined state of the liquid discharge recording unit, the handling of the cap and the ink suction process can be accomplished by a single drive source, and this also leads to the realization of an inexpensive and compact ink jet printer.

I claim:

1. An ink jet printer comprising:

liquid discharge recording means for discharging ink onto the recording surface of a recording medium and effecting recording;

transportation means carrying said liquid discharge recording means and being movable in a predetermined direction relative to said recording surface;

an ink container mounted on said transportation means for containing therein the ink to be supplied to said liquid discharge recording means;

communication means for communicating said ink container with said liquid discharge recording means, said communication means including two electrically conductive pipe members and an electrically nonconductive pipe member between said two electrically conductive pipe members; and detecting means located in relation to said communication means for detecting the mixing of air by detecting the resistance between said two electrically conductive pipe members.

2. An ink jet printer according to claim 1, wherein said ink container includes a plurality of container members and a plurality of said communincation means are provided, each corresponding to a respective said container member.

3. An ink jet printer according to claim 2, wherein two of said respective electrically conductive pipe members are fixed to a common electrically conductive fixing member.

4. An ink jet printer according to claim 1, wherein said ink container is removably mounted on said transportation means.

* * * * *